United States Patent
Andersson

(10) Patent No.: US 8,284,728 B2
(45) Date of Patent: Oct. 9, 2012

(54) DPCCH AND HS-DPCCH CONTROL AT LOW GRANTS FOR E-DCH

(75) Inventor: Andreas Andersson, Landvetter (SE)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 350 days.

(21) Appl. No.: 12/744,729

(22) PCT Filed: Nov. 26, 2007

(86) PCT No.: PCT/EP2007/062829
§ 371 (c)(1),
(2), (4) Date: May 26, 2010

(87) PCT Pub. No.: WO2009/068077
PCT Pub. Date: Jun. 4, 2009

(65) Prior Publication Data
US 2010/0303030 A1    Dec. 2, 2010

(51) Int. Cl.
*H04W 4/00* (2009.01)
(52) U.S. Cl. ........................................ 370/329
(58) Field of Classification Search .............. 370/203, 370/204–215, 229–240, 310–337, 338–350, 370/351–394, 395.1, 395.3, 395.4, 395.41, 370/395.42, 395.5, 395.52, 395.53, 412–421, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 7,117,003 B2* | 10/2006 | Kayama et al. | ............... | 455/522 |
| 7,120,134 B2* | 10/2006 | Tiedemann et al. | .......... | 370/329 |
| 7,339,950 B2* | 3/2008 | Nielsen et al. | ................ | 370/468 |
| 7,385,951 B2* | 6/2008 | Balachandran et al. | ...... | 370/329 |
| 7,551,637 B2* | 6/2009 | Damnjanovic et al. | ........ | 370/412 |
| 7,653,021 B2* | 1/2010 | Schulist | ........................ | 370/328 |
| 7,801,550 B2* | 9/2010 | Hayashi et al. | ............... | 455/522 |
| 7,830,835 B2* | 11/2010 | Marinier | ....................... | 370/329 |
| 7,839,830 B2* | 11/2010 | Sang et al. | .................... | 370/337 |
| 7,940,720 B2* | 5/2011 | Tiedemann et al. | ......... | 370/329 |
| 7,940,721 B2* | 5/2011 | Bachl et al. | ................... | 370/329 |
| 7,983,687 B2* | 7/2011 | Englund et al. | .............. | 455/450 |
| 8,023,988 B2* | 9/2011 | Shiu et al. | ..................... | 455/522 |
| 8,036,668 B2* | 10/2011 | Panico et al. | ................. | 455/446 |
| 8,050,222 B2* | 11/2011 | Maeda et al. | ................. | 370/329 |
| 8,073,451 B2* | 12/2011 | Nobukiyo | ..................... | 455/450 |
| 8,095,143 B2* | 1/2012 | Amirijoo et al. | ........... | 455/452.1 |
| 8,098,581 B2* | 1/2012 | Tiedemann et al. | ......... | 370/235 |
| 8,098,715 B2* | 1/2012 | Fulghum et al. | ............. | 375/149 |
| 8,126,403 B2* | 2/2012 | Wang Helmersson et al. | ............................ | 455/63.1 |

(Continued)

Primary Examiner — Kwang B Yao
Assistant Examiner — Jung-Jen Liu

(57) ABSTRACT

A method for power control in an enhanced uplink telecommunication system is disclosed. The power for an uplink DPCCH in a first E-DCH is controlled by a base station. The base station and a user calculate power for an E-DPDCH in the first E-DCH based on a power offset configuration and absolute grant provided by the base station. The user terminal transmits the uplink data traffic on the first E-DCH with the controlled DPCCH power and the calculated E-DPDCH power. When the base station and the user terminal detect that the E-DPDCH absolute grant is different from a grant threshold, the base station changes a SIR target value. The first base station and the first user terminal compensate the change by recalculating the E-DPDCH power, reflecting both the changed DPCCH power resulting from the changed SIR target value and the improvement due to optimized channel estimation.

30 Claims, 9 Drawing Sheets

U.S. PATENT DOCUMENTS

| | | |
|---|---|---|
| 8,135,429 B2 * | 3/2012 | Kuroda et al. ............... 455/522 |
| 8,139,534 B2 * | 3/2012 | Goto et al. .................. 370/329 |
| 8,160,075 B2 * | 4/2012 | Kazmi et al. ............. 370/395.42 |
| 8,160,631 B2 * | 4/2012 | Raghothaman et al. ...... 455/522 |
| 8,169,976 B2 * | 5/2012 | Usuda et al. ................. 370/333 |
| 8,175,100 B2 * | 5/2012 | Goteti et al. ............... 370/395.4 |
| 8,184,597 B2 * | 5/2012 | Englund et al. ............. 370/335 |
| 2004/0160959 A1 * | 8/2004 | Balachandran et al. ... 370/395.4 |
| 2005/0159176 A1 * | 7/2005 | Uehara et al. ............... 455/522 |
| 2005/0186981 A1 * | 8/2005 | Nishio ......................... 455/522 |
| 2007/0259668 A1 * | 11/2007 | Legg ............................ 455/450 |
| 2008/0025264 A1 * | 1/2008 | Willenegger et al. ........ 370/333 |
| 2008/0207247 A1 * | 8/2008 | Gholmieh et al. ........... 455/522 |
| 2010/0210255 A1 * | 8/2010 | Amirijoo et al. ............. 455/419 |
| 2011/0286347 A1 * | 11/2011 | Mohanty et al. ............. 370/252 |
| 2012/0113834 A1 * | 5/2012 | Hunzinger ................... 370/252 |

* cited by examiner

Maximum serving grant = maximum serving grant (based on absolute grants given by the serving cell) as given by 3G TS 25.321

If maximum serving grant < grant threshold 1

SIR target = (SIR target as controlled by the RNC) + delta SIR 1
    Reference power offset k = (reference power offset k as controlled by the RNC) + delta power offset 1 (for all k)
    HS-DPCCH power offset = (hs-dpcch power offset as controlled by the RNC) + delta power offset 2
    E-DPCCH power offset = (e-dpcch power offset as controlled by the RNC) + delta power offset 3 end if

FIG 8

Maximum serving grant = maximum serving grant (based on, absolute grants given by the serving cell) as given by 3G TS 25.321

If maximum serving grant < grant threshold 1

Reference power offset k = (reference power offset k as controlled by the RNC) + delta power offset 1 (for all k)
    HS-DPCCH power offset = (hs-dpcch power offset as controlled by the RNC) + delta power offset 2
    E-DPCCH power offset = (e-dpcch power offset as controlled by the RNC) + delta power offset 3 end if

FIG 9

DPCCH AND HS-DPCCH CONTROL AT LOW GRANTS FOR E-DCH

TECHNICAL FIELD

The present invention relates to a method and a telecommunication system for power control, and a base station and a user terminal in the system enabling said method.

BACKGROUND

There is an increasing need of delivering wireless technology with broadband capacity for cellular networks. A good broadband system must fulfil certain criteria, such as high data rate and capacity, low cost per bit, good Quality of Service and greater coverage. High Speed Packet Access (HSPA) is an example of a network access technology that enables this.

HSPA is a collection of protocols which improves the performance of existing Universal Mobile Telecommunication Systems (UMTS), which is a third generation (3G) cell phone technology. UMTS uses Wideband Code Division Multiple Access (WCDMA) as air interface for the radio-based communication between user equipment (UE), in form of a mobile terminal, and the base station (BS). The air interface in the Open Systems Interconnection (OSI) model comprises layers 1 and 2 of the mobile communications system, establishing a point-to-point link between the UE and a radio access node (RAN).

HSPA is an integral part of WCDMA. Wide-area mobile coverage can be provided with HSPA. It does not need any additional spectrum or carriers. Currently, WCDMA can provide simultaneous voice and data services to users on the same carrier. This also applies to HSPA which means that spectrum can be used efficiently. Simulations show that in a moderately loaded system, HSPA can largely reduce the time it takes to download and to upload large files. The primary benefits of HSPA are improved end-user experience. In practice, this means shorter UL and DL times as a result of higher bit-rates and reduced latency compared to earlier releases of WCDMA. HSPA also benefits operators by reducing the production cost per bit. More users can be served with higher bit-rates at lower production costs.

HSPA is the set of technologies defining the migration path of WCDMA operators worldwide. The two existing features, High Speed Downlink Packet Access (HSDPA) and High Speed Uplink Packet Access (HSUPA), in the HSPA family provides the increased performance by using improved modulation schemes and by refining the protocols by which handsets and base stations communicate. These improvements lead to the better utilization of the existing radio bandwidth provided by UMTS.

High Speed Downlink Packet Access (HSDPA) is the first feature within HSPA. It is part of the WCDMA Third Generation Partnership Project (3GPP) Release 5 specification. HSDPA provides a new downlink transport channel that enhances support for high-performance packet data applications. It represents the first step in the evolution of WCDMA performance. HSDPA can deliver an up to 35 fold increase in downlink data rates of standard WCDMA networks, enabling users to access the Internet on mobile phones and laptops, at speeds previously associated with fixed line DSL.

HSDPA is based on shared channel transmission, which means that some channel codes and the transmission power in a cell are seen as a common resource that is dynamically shared between users in the time and code domains for a more efficient use of available codes and power resources in WCDMA. The radio channel conditions experienced by different downlink communication links vary significantly, both in time and between different positions in the cell. To compensate for rapidly varying radio conditions in the downlink, HSDPA relies on bit-rate adjustment. That is, while keeping transmission power constant, it adjusts (by lowering) the data rate by adjusting the modulation.

Along with the HS-DSCH (High Speed Downlink Shared Channel) physical channel on which payload data is sent, three new physical channels are also introduced: HS-SCCH, HS-DPCCH and HS-PDSCH. The High Speed-Shared Control Channel (HS-SCCH) informs the user that data will be sent on the HS-DSCH 2 slots ahead. The Uplink High Speed-Dedicated Physical Control Channel (HS-DPCCH) carries acknowledgment information and current channel quality indicator (CQI) of the user. This value is then used by the base station to calculate how much data to send to the user devices on the next transmission. The High Speed-Physical Downlink Shared Channel (HS-PDSCH) is the channel mapped to the above HS-DSCH transport channel that carries actual user data.

High Speed Uplink Packet Access (HSUPA) is the second feature within HSPA. It is part of the WCDMA Third Generation Partnership Project (3GPP) Release 6 specification. HSUPA provides a new uplink (UL) transport channel called Enhanced Dedicated CHannel (E-DCH). HSUPA dramatically increases the uplink data traffic rate. It provides a possibility to significantly increase the amount of data uploaded over mobile networks, especially user-generated content. Although a lot of it is downlink oriented, there are still quite a number of applications that will benefit from an improved uplink. These include the sending of large e-mail attachments, pictures, video clips, blogs etc. HSUPA is also known as Enhanced UL. In contrast to HSDPA, the new uplink channel that is introduced for Enhanced Uplink is not shared between users, but is dedicated to a single user.

FIG. 1 shows a HSUPA network overview. A user terminal 15 communicates with the core network CN via at least one base station 11. The system further comprises a second base station 10 with a corresponding system. A first radio network controller RNC 12 establishes an E-DCH which enables uplink data traffic from the user terminal to the base station. The E-DCH carries data for at least one radio network bearer. The term "Iu" in FIG. 1 represents the interface between RNC and core network. The term "Iub" represents the interface between RNC and the radio bases station (RBS).

Several new physical channels are added to provide and support high-speed data transmission for the E-DCH. As shown in FIG. 1, two new code-multiplexed uplink channels are added:

E-DCH Dedicated Physical Data Channel (E-DPDCH)
E-DCH Dedicated Control Channel (E-DPCCH)

E-DPDCH carries the payload data, and the E-DPCCH carries the control information associated to the E-DPDCH. E-DPDCH is used to carry the E-DCH transport channel. There may be zero, one or several E-DPDCH on each radio link wherein there is at most one E-DPCCH on each radio link. E-DPDCH and E-DPCCH are always transmitted simultaneously. E-DPCCH shall not be transmitted in a slot unless E-DPDCH is also transmitted in the same slot.

Similarly, three new channels, see FIG. 1, are added to the downlink for control purposes:

E-DCH Hybrid Automatic Repeat Request (HARQ) Indicator Channel (E-HICH) carrying the uplink E-DCH hybrid Acknowledgement (ACK) and Negative ACK (NACK) indicator.

E-DCH Absolute Channel (E-AGCH) carrying absolute grants, which means that it provides an absolute limitation of the maximum amount of uplink resources the UE may use.

E-DCH Relative Grant Channel (E-RGCH) carrying the uplink E-DCH relative grants, which means that it controls the resource limitations by increasing or decreasing the limitations with respect to the current serving grant.

E-AGCH is only transmitted from the serving cell. E-RGCH and E-HICH are transmitted from radio links that are part of the serving radio link set and from non-serving radio links.

As shown in FIG. 1 the same E-DCH can be provided both through the first RNC 12 for the serving cell and through a second RNC (RNC2) 13 for the non-serving cell. The second RNC 13 serves a separate base station 10 with a Node B NB2 and an enhanced UL scheduler (EUL-S2). Except for E-AGCH (which can only be transmitted through the serving cell) all the physical channels can be transmitted through either of the cells. As an alternative one RNC can serve both a serving cell and a non-serving cell. The term "Iur" in FIG. 1 represents the interface between the first RNC 12 and the second RNC 13. Only one RNC will communicate with the core network (e.g. the first RNC). The first RNC is in control of the connection and handles things like soft handover.

Note that HSUPA channels are added on top of uplink/downlink dedicated channels. Each UE 15 therefore additionally carries an uplink and downlink dedicated physical channel (DPCH), see FIG. 1. In the downlink, a fractional dedicated channel (F-DPCH) can be used alternatively. The F-DPCH carries control information and is a special case of downlink Dedicated Physical Control Channel (DPCCH). UL might only contain the DPCCH as in FIG. 1. It could also contain a Dedicated Physical Data Channel (DPDCH). The F-DPCH has been introduced in 3GPP release 6 in order to optimize the downlink codes usage.

The UL scheduling is of central importance for HSUPA. It is provided by an enhanced UL scheduler (EUL-S) located in the Node B, see FIG. 1, close to the air interface. The task of EUL-S is to control the UL resources the UEs 15 in the cell are using. It operates on a request-grant principle where the UE requests a permission to send data and the scheduler decides when and how much data an UE is allowed to send and also how many UEs will be allowed to do so. With the EUL-S a scheme is introduced where the Node B controls the UL transmissions by providing grants for the UE. The cell appointed as serving cell (server by Node B NB) is the primary control of the scheduling mechanism by means of sending either absolute or relative grants. Thereby the maximum allowed HSUPA transmission is controlled. This effectively limits the transport block size the UE can select and thus the uplink data traffic rate. It enables the system to admit a larger number of high-data rate users and rapidly adapts to interference variations—leading to an increase both in capacity and the likelihood that a user will experience high data rates.

The grants are expressed as power headroom 14, for the E-DPDCH (grant) relative to the DPCCH transmission power (DPCCH (set)), that the UE 15 may use for scheduled transmissions. This is illustrated in FIG. 2. See also 3GPP 25.214, which for instance describes the relation between the E-DPDCH power and the DPCCH power value. In general, the power headroom defines the maximum allowed power offset, for instance for E-DPDCH.

Power (watt) is on the Y-axis and time (seconds) on the X-axis, FIG. 2. The DPCCH (set) power varies in dependency on the operation by the UE 15 and Node B and follows a SIR target, which will be described in relation to the power control of the DPCCH, DPCCH is power controlled as specified in the third generation partnership project 3GPP document TS 25.214. The E-DPDCH power is converted to a scheduled bit rate by the UE.

As a basic principle of the uplink scheduling mechanism, the UE 15 maintains a serving grant which at least represents the maximum E-DPDCH power offset, the power headroom, which the UE may use in the next transmission. This is illustrated in FIG. 3. Power (watt) is on the Y-axis and time (seconds) on the X-axis. The line E-DPDCH (used) is the present E-DPDCH power offset (read load) used by the channel at a certain time T (seconds). The available uplink power offset determines the possible data rate.

The absolute grants ($AG_0$, $AG_1$) are used to initialize the scheduling process and provide absolute transmit power offset/bit rate (the power headroom) for the UE 15. It allows the Node B scheduler to directly adjust the granted bit rate of UEs under its control. The relative grants ($RG_0$) are used for incremental up- or downgrades (by a predefined step) from the currently used power headroom (transmit power). The absolute grant is carried by the downlink physical channel E-AGCH and the relative grant is carried by the downlink physical channel E-RGCH.

The power control results in less interference and allows more users on the same carrier. Power control thus provides more capacity in the network. There is a fast closed loop power control for all the UL signals to avoid power imbalance between different UE 15 signals and to combat fast fading. The Node B for instance measures continuously a signal-to-interference ratio (SIR) of the DPCCH transmitted by the UE. SIR relates to the fact that a certain DPCCH power is needed in relation to the interference so that the system is able to decode a data packet. Measurement shall be performed on the DPCCH. SIR is the quotient between the average received modulated carrier power and the average received co-channel interference power, e.g. cross-talk from other transmitters than the useful signal.

This real time SIR measured is compared to a SIR target provided by the RNC 12. The Node B transmits a power control (TPC) command in a downlink to the UE 15 to increase or decrease the transmit DPCCH power level so that the real time SIR measured is controlled towards the SIR target. This is for instance described in GB 2336740. The basic step is +/−1 dB/slot and eventually 2 dB. With this power control, the signals from different UEs can be received with the required quality at changing conditions.

All other physical channels are related to the DPCCH by means of the configured power offsets. The configuration of the power offset for E-DPDCH depends on the amount of data presently transmitted UL. In general DPCCH forms the basis for the rapid power control (1500 Hz+/−1 dB at each occasion). Dependent on the amount of data transmitted momentary (for instance in one frame or subframe for E-DPDCH) a power offset is decided for instance for the E-DPDCH. This power offset can be signalled via the control signalling to the UE 15 but can also be calculated by the UE from an extrapolation or interpolation from a limited number of reference points.

For E-DPDCH the power relates to the power level of DPCCH by the power offset. This power offset varies and is reconfigured continuously by the UE 15 and the RBS simultaneously. The real time value for the E-DPDCH power is calculated on the basis of the DPCCH power by the power offset. The E-DPDCH power if defined as the DPCCH power+the power offset for E-DPDCH. This power offset depends on the amount of data that should be sent in a certain TTI (Transmission Time Interval).

There is a capacity trade-off for the SIR on the DPCCH. Moreover, if DPCCH is increased the other channels are also increased, e.g. power offset on E-DPDCH. If the channel estimation (number of components, relative joint relationship) is optimized it is also possible to perform a maximum ratio combining—MRC, which means that the data bits can be decoded with the lowest possible SIR. The quality of the channel estimate depends on the SIR for the control bits (pilot bits on DPCCH) on which the estimation is based. The consequence is that the requirement on SIR for the data bits can be reduced if SIR for the control bits is increased.

At high power offsets for the other physical UL channels, in this case E-DPDCH in particular, the drawbacks relating to the increase of SIR for DPCCH is low compared to the benefits relating to improved channel estimation. A reduction of e.g. E-DPDCH power (due to improved_channel estimation) from a high offset creates a relatively large benefit. A high SIR target for DPCCH is beneficial to enable an improved channel estimate (estimated on the DPCCH) which will lower the required SIR for the E-DPDCH and thus the E-DCH load is reduced.

Raising the SIR target for DPCCH results in an improved channel estimate, but since SIR is the quotient between the channel power and the average received co-channel interference power, a raised SIR target increases the_DPCCH power.

This result in the problem that at low power for the E-DPDCH the drawbacks relating to raising the DPCCH (by raising the SIR target for the DPCCH) can become significant compared to the benefits relating to an improved channel estimation (improved performance for E-DPDCH. A reduction of e.g. E-DPDCH (due to channel estimation) creates a relatively small benefit. The extra load in DPCCH at low power (grants) can not be motivated by the reduced E-DCH load (due to the low power offset), since the E-DCH load is anyway rather low.

The relationship between the E-DCH load and the DPCCH load is illustrated in FIG. 4. Line C relates to high E-DCH load (high grant), line A to low E-DCH load (low grant) and B to DPCCH. Load is on the Y-axis and SIR on the X-axis. Here it can be seen that in point H, which relates to high grant, the extra load in DPCCH (due to higher SIR which improves the channel estimate) can be motivated because of the reduced E-DCH load. In point L, which relates to low grant, the extra load in DPDCH can not be motivated by the reduced E-DCH load. The reason is that the E-DCH load is anyway rather low.

SUMMARY

The object of the present invention is to solve the above problem by a method and an enhanced UL telecommunication system for power control and a base station and a user terminal in the system enabling said method.

The problem is solved by means of a method for power control in an enhanced uplink (UL) telecommunication system. The system comprises at least one first radio network controller (RNC) and at least one first base station which enables wireless communication with at least one first user terminal. The power for an uplink Dedicated Physical Control Channel (DPCCH) in a first enhanced UL transport channel (E-DCH) is controlled. The control is made by the first base station on the basis of a signal to interference ratio (SIR) target value sent by the first RNC. Thereby, the SIR real time value for the UL DPCCH is controlled towards the target value.

The first user terminal and the first base station further calculate a power for at least an Enhanced Dedicated Physical Data Channel (E-DPDCH) in the first E-DCH, which power is defined as the sum of the DPCCH power and a power offset. The calculation is at least based on a power offset configuration and an absolute grant provided by the first base station, which grant at least set the maximum E-DPDCH power. The first user terminal further transmits the uplink data traffic on the first E-DCH with the controlled DPCCH power and the calculated E-DPDCH power.

What particularly characterises the method according to the present invention is that when the first base station and the first user terminal detects that the E-DPDCH absolute grant is reduced below or increased above a grant threshold, the base station changes the SIR target value. Further, the first base station and the first user terminal compensates the change of the target value by recalculating at least the E-DPDCH power so that the power reflects both the changed DPCCH power resulting from the changed SIR target value and the improvement due to optimized channel estimation in case of changed SIR real time value.

The problem is also solved by means of an enhanced uplink (UL) telecommunication system comprising mechanisms arranged for power control. The system comprises at least one first radio network controller (RNC) and at least one first base station enabling wireless communication with at least one first user terminal. The first base station (11) comprises a mechanism arranged for controlling the power for an uplink Dedicated Physical Control Channel (DPCCH) in a first enhanced UL transport channel (E-DCH). The control is made on the basis of a signal to interference ratio (SIR) target value sent by the first RNC (12), so that the SIR real time value for the UL DPCCH is controlled towards the target value.

A mechanism in the first user terminal and the first base station mechanism are arranged for calculating a power for at least an Enhanced Dedicated Physical Data Channel (E-DPDCH) in the first E-DCH, which power is defined as the sum of the DPCCH power and a power offset. The calculation is at least based on a power offset configuration and an absolute grant provided by the first base station, which grant at least set the maximum E-DPDCH power. The first user terminal mechanism is arranged for transmitting the uplink data traffic on the first E-DCH with the controlled DPCCH power and the calculated E-DPDCH power.

What particularly characterizes the system of the present invention is that the first base station mechanism is arranged for changing the SIR target value when the first base station and the first user terminal detects that the E-DPDCH absolute grant is reduced below or increased above a certain value. Further, the first base station mechanism and the first user terminal mechanism are arranged for compensating the change of the target value by recalculating at least the E-DPDCH power so that the power reflects both the changed DPCCH power, resulting from the changed SIR target value, and the improvement due to optimized channel estimation in case of changed SIR real time value.

The problem is further solved by means of a base station comprising a mechanism arranged for power control in an enhanced uplink (UL) telecommunication system. The system further comprises at least one first radio network controller (RNC), the at least one first base station enabling wireless communication with at least one first user terminal. The first base station (11) mechanism is arranged for controlling the power for an uplink Dedicated Physical Control Channel (DPCCH) in a first enhanced UL transport channel (E-DCH). The control is made on the basis of a signal to interference ratio (SIR) target value sent by the first RNC (12), so that the SIR real time value for the UL DPCCH is controlled towards the target value. The first base station mechanism is arranged for calculating a power for at least an Enhanced Dedicated Physical Data Channel (E-DPDCH) in the first E-DCH, which power is defined as the sum of the DPCCH power and a power offset. The calculation is at least based on a power offset configuration and an absolute grant provided by the first base station, which grant at least set the maximum E-DPDCH power.

What particularly characterizes the first base station mechanism according to the present invention is that it is arranged for changing the SIR target value when the first base station detects that the E-DPDCH absolute grant is reduced below or increased above a certain value. Further, the first base station mechanism is arranged for compensating the change of the target value by recalculating at least the E-DPDCH power so that the power reflects both the changed DPCCH power, resulting from the changed SIR target value, and the improvement due to optimized channel estimation in case of changed SIR real time value.

The problem is finally solved by means of a user terminal comprising a mechanism arranged for power control in an enhanced uplink (UL) telecommunication system. The system further comprises at least one first radio network controller (RNC) and at least one first base station enabling wireless communication with at least one first user terminal (15). The first base station controls the power for an uplink Dedicated Physical Control Channel (DPCCH) in a first enhanced UL transport channel (E-DCH) on the basis of a signal to interference ratio (SIR) target value sent by the first RNC (12), so that the SIR real time value for the UL DPCCH is controlled towards the target value.

The first user terminal mechanism is arranged for calculating a power for at least an Enhanced Dedicated Physical Data Channel (E-DPDCH) in the first E-DCH, which power is defined as the sum of the DPCCH power and a power offset. The calculation is at least based on a power offset configuration and an absolute grant provided by the first base station, which grant at least set the maximum E-DPDCH power. The first user terminal (15) mechanism is arranged for transmitting the uplink data traffic on the first E-DCH with the controlled DPPCH power and the calculated E-DPDCH power.

What particularly characterizes the first user terminal mechanism according to the present invention is that it is further arranged for changing the SIR target value when the first base station detects that the E-DPDCH absolute grant is reduced below or increased above a grant threshold. The first user terminal mechanism is arranged for compensating the change of the target value by recalculating at least the E-DPDCH power, so that the power reflects both the changed DPCCH power resulting from the changed SIR target value and the improvement due to optimized channel estimation in case of changed SIR real time value.

The solution provides a possibility to use the trade-off between SIR and the E-DCH power to improve the UL capacity to some degree. It provides a mechanism to determine when it is beneficial to operate at a lower SIR target together with a mechanism for configuring this in the UE 15.

Reducing the SIR target by a configured amount when the base station knows that the UE will only use low power offsets for at least the E-DPDCH, and compensate this in the configuration of the power offsets for at least the E-DPDCH will save some of the uplink interference headroom. Moreover, increasing the SIR target and compensating the power offset for this when the UE will be able to use high power offsets for the E-DPDCH, will also optimize the usage of the UL interference headroom.

Moreover, by using a few parameters signalled from the RNC to the UE and the Node B it is possible to exploit the capacity trade-off for SIR target and power offsets for primarily E-DPDCH.

BRIEF DESCRIPTION OF DRAWINGS

In the following text the invention will be described in detail with reference to the attached drawings. These drawings are used for illustration only and do not in any way limit the scope of the invention:

FIG. 8 shows the performance of the first base station
FIG. 9 shows the performance of the first user terminal

DETAILED DESCRIPTION

Figure 1:
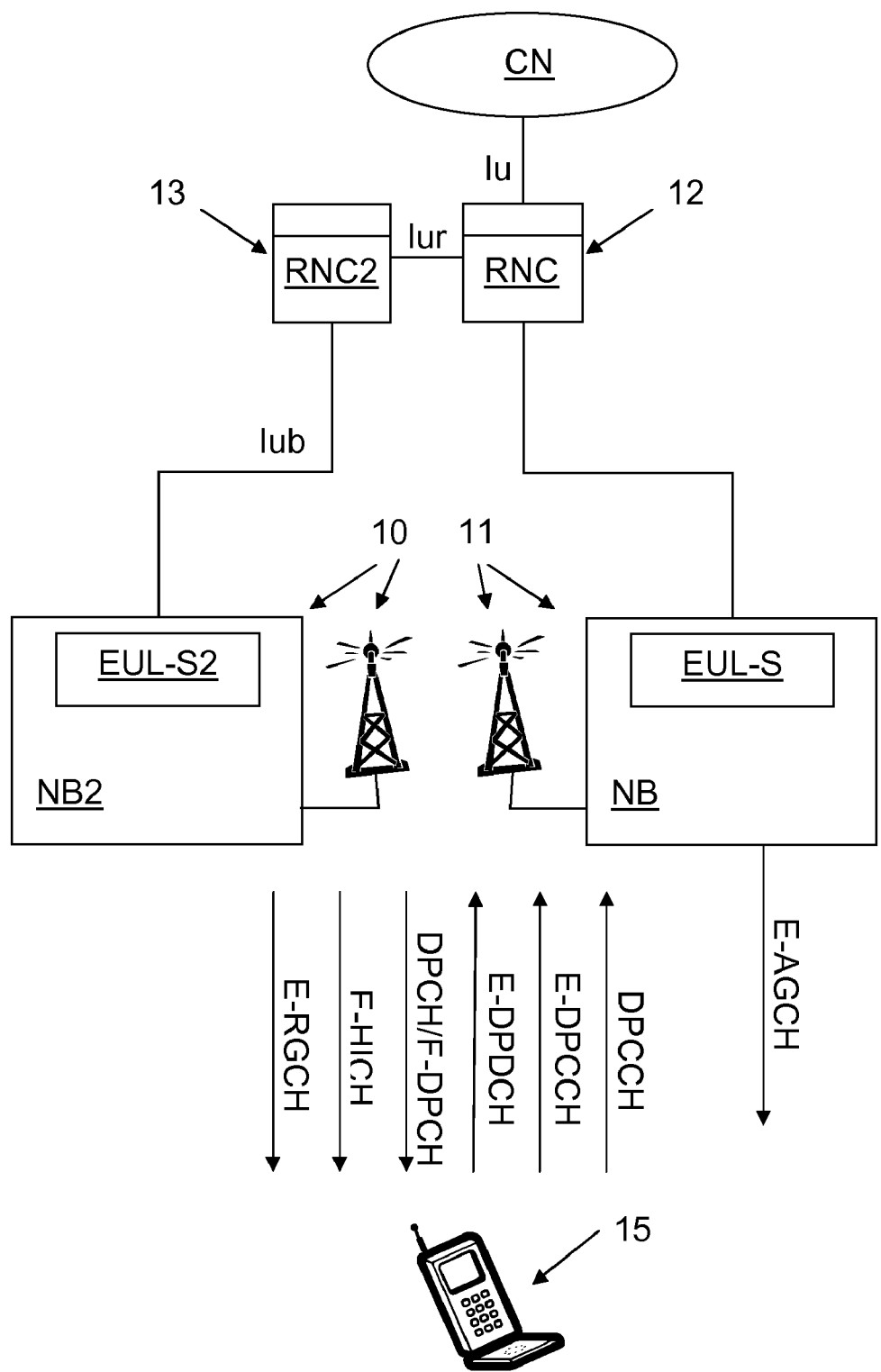
FIG. 1 shows a HSUPA network overview.

The invention will now be described in detail with reference to embodiments described in the detailed description and shown in the drawings.

The embodiments refer to a method and a telecommunication system for power control, and a base station and a user terminal in the system enabling said method. The system and the base station in the system are adapted to perform the method steps as described in the method. It should be understood by a person skilled in the art that the fact the system and in particular the system parts perform a method step means that it is adapted to perform said step. This is enabled by introducing new mechanisms into the system parts, the new mechanisms being arranged for performing the method steps described herein.

Figure 5:
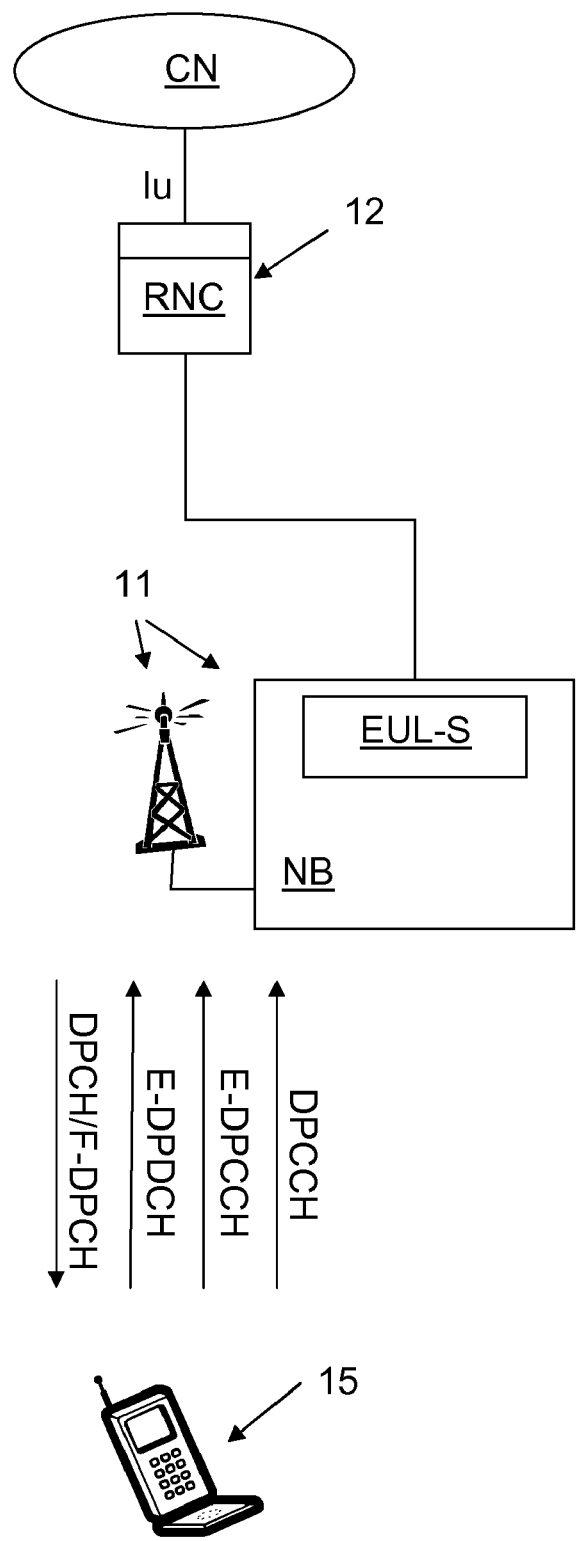
FIG. 5 shows a simplified HSUPA network overview.

FIGS. 1 and 5 shows a HSUPA network overview. A user terminal 15 communicates with the core network CN via a base station 11. A radio network controller RNC 12 establishes an Enhanced Dedicated Channel (E-DCH) which enables uplink data traffic from the user terminal 15 to the base station, the first E-DCH carrying data for at least one radio access bearer (RAB).

The present invention relates to a method for power control in an enhanced uplink (UL) telecommunication system, corresponding to a HSUPA system. The HSUPA system comprises at least one first base station 11 which enables wireless communication, with a first or more user terminals 15.

A first radio network controller RNC 12 establishes (more than one RNC can be involved) at least a first enhanced UL transport channel (E-DCH), which enables uplink data traffic with a certain data rate from the first user terminal 15 to the first base station 10. The RNC may establish E-DCH channels also to other base stations. The E-DCH carries data for at least one radio access bearer (RAB). The E-DCH is used for data and control signalling between the user terminal 15 and the core network CN, when the data transmission starts.

The power for an uplink Dedicated Physical Control Channel—DPCCH in the first E-DCH is controlled by the first base station 11 on the basis of a signal to interference ratio (SIR) target value sent by the first RNC (12) so that the SIR real time value for the UL DPCCH is controlled towards the target value.

The Node B NB in the base station 11 measures continuously the SIR real time value of the DPCCH transmitted by the first user terminal 15. SIR relates to the fact that a certain DPCCH power is needed in relation to the interference so that the system is able to decode a data packet. It is the quotient between the average received modulated carrier power and the average received co-channel interference power e.g. cross-talk from other transmitters than the useful signal. This real time SIR measured is compared to a SIR target provided by the RNC 12.

The first user terminal 15 and the first base station 11 calculate a power for at least an Enhanced Dedicated Physical Data Channel (E-DPDCH) in the first E-DCH. The power is defined the sum of the DPCCH power and a power offset. The calculation is at least based on a power offset configuration provided by the first RNC 12 and an absolute grant provided by the base station 11. The grant at least set the maximum E-DPDCH power.

This means that the DPCCH power also regulates the power, e.g. for E-DPDCH, for a certain rate, since this physical channel is dependent on DPCCH by a power offset. This offset is defined in 3GPP standard 25.214. The basis for calculating the power offset is defined in the power offset configuration and the E-DPDCH power is calculated as the DPCCH power+the power offset for E-DPDCH.

Figure 2:
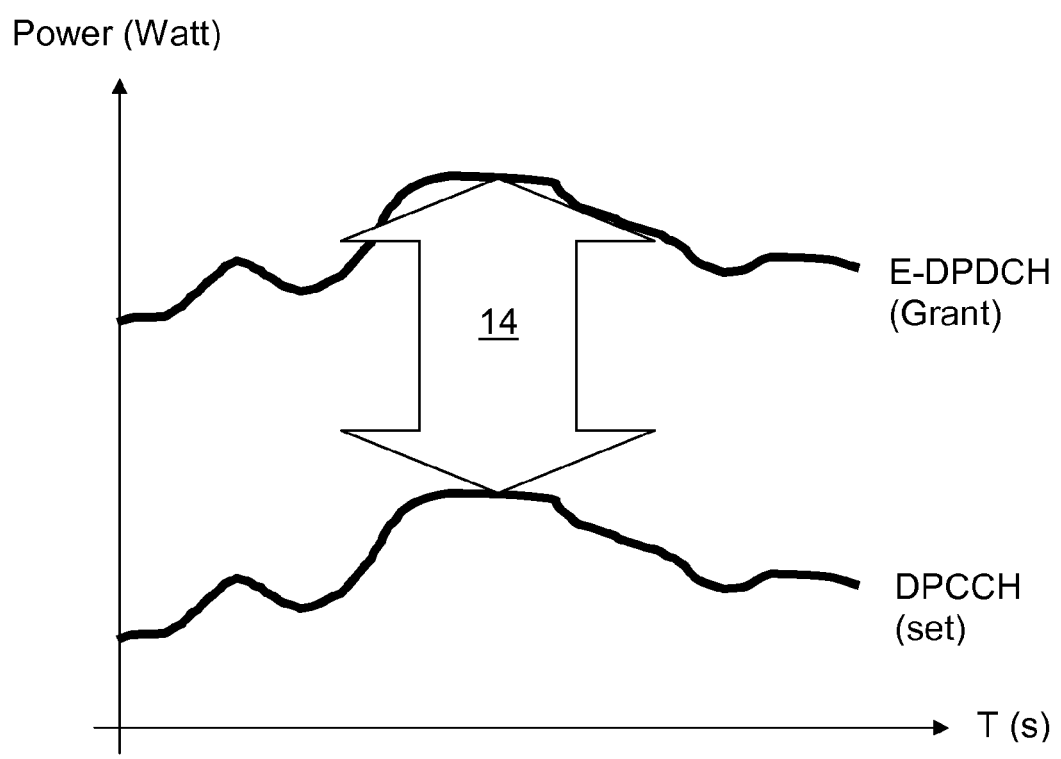
FIG. 2 shows the power headroom related to the DPCCH power via scheduled grant.
Figure 3:
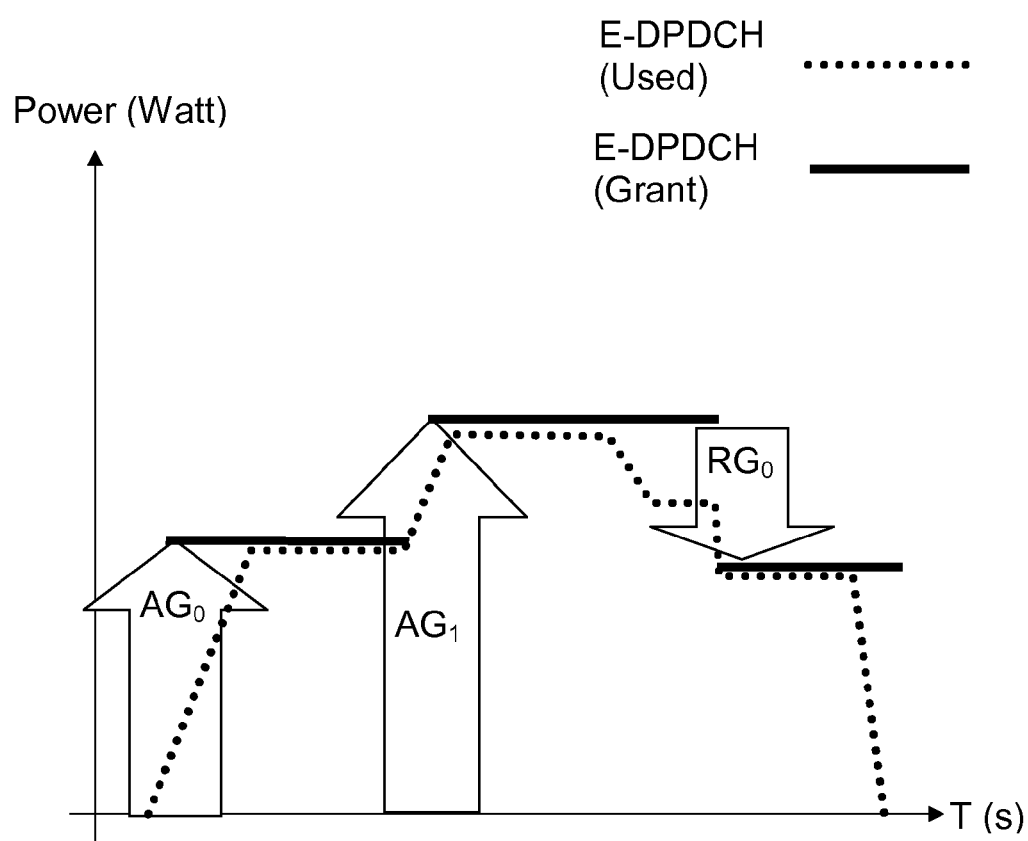
FIG. 3 shows the absolute and relative scheduled grants.

As a basic principle of the uplink scheduling mechanism, the first user terminal 15 maintains a serving grant which represents the maximum E-DPDCH power offset, the power headroom, which the first user terminal 15 may use in the next transmission, see FIGS. 2-3 and the corresponding parts of the description. The absolute grant is used to set the maximum scheduled grant. The DPCCH power and the power, e.g. for E-DPDCH, corresponds to a scheduled bit rate possibly sent by the first user terminal 15 which means that the grant defines the maximum bit rate UL.

The momentary E-DPDCH power offset (relative to DPCCH) is described by a gain factor, and depends on the amount of data presently transmitted UL.

The first user terminal (15) transmits the uplink data traffic on the first E-DCH with the controlled DPCCH power and the calculated E-DPDCH power. This means that DPCCH is transmitted with the power set by the inner loop power control (TPC) and the other physical channels, e.g. E-DPDCH, is transmitted with the power calculated on the basis of the power offset configuration.

There is a capacity trade-off for the SIR on the DPCCH. Moreover, if DPCCH is increased the other channels are also increased, e.g. power level on E-DPDCH. If the channel estimation (number of components, relative joint relationship) is optimized it is also possible to perform a maximum ratio combining (MRC), which means that the data bits can be decoded with the lowest possible SIR. The quality of the channel estimate depends on the SIR for the control bits (pilot bits on DPCCH) on which the estimation is based. The consequence is that the requirement on SIR for the data bits can be reduced if SIR for the control bits is increased. At high power, the drawbacks relating to the increase of SIR for DPCCH is low compared to the benefits relating to an improved channel estimation.

However, the problem is that at low power for the E-DPDCH, the drawbacks relating to raising the DPCCH (by raising the SIR target for the DPCCH) can become significant compared to the benefits relating to an improved channel estimation (improved performance for E-DPDCH). The extra load in DPCCH at low E-DPDCH power (grants) can not be motivated by the reduced E-DCH load (due to the low power offset), since the E-DCH load is anyway rather low.

Figure 4:
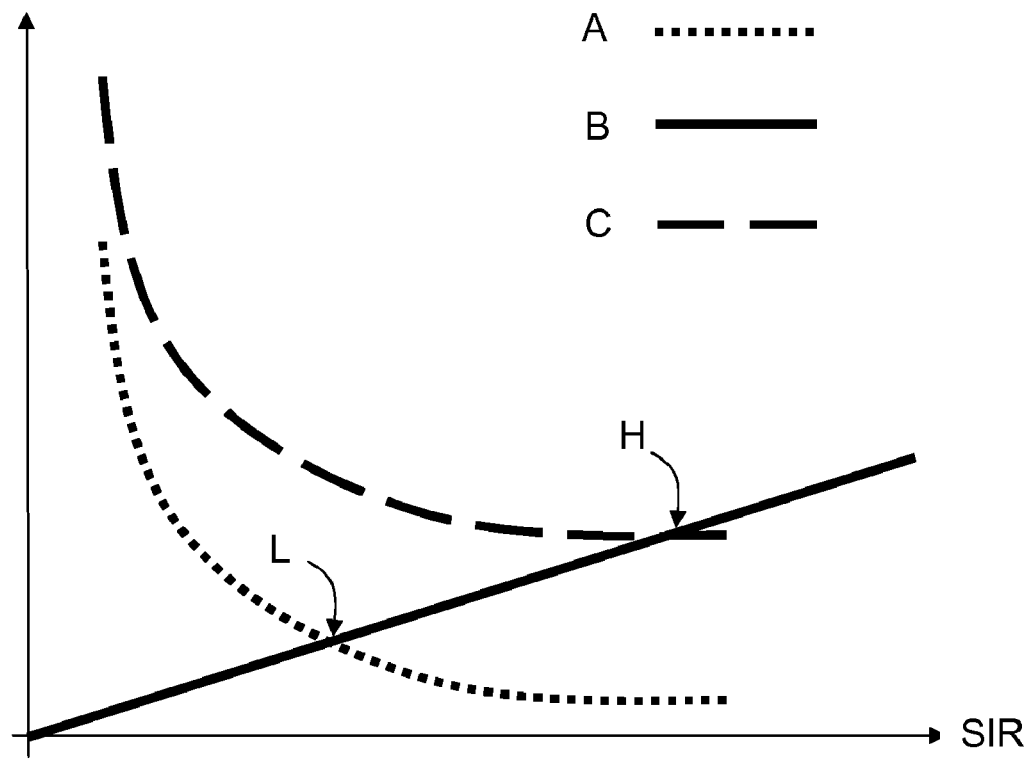
FIG. 4 shows the principles for SIR trade-off in E-DCH power control.

The relationship between the E-DCH load and the DPCCH load is illustrated in FIG. 4. Line C relates to high E-DCH load (high grant), line A to low E-DCH load (low grant) and B to DPCCH. Load is on the Y-axis and SIR on the X-axis. Here it can be seen that in point H, which relates to high grant, the extra load in DPCCH (due to higher SIR which improves the channel estimate) can be motivated because of the reduced E-DCH load. In point L, which relates to low grant, the extra load in DPDCH can not be motivated by the reduced E-DCH load. The reason is that the E-DCH load is anyway rather low.

This problem is solved by the following means. When the first base station 11 and the first user terminal 15 detects that the E-DPDCH absolute grant is reduced below or increased above a grant threshold, see FIG. 4, the SIR target value is changed by the base station 11. Moreover, to benefit from the optimized channel estimation, the first base station 11 and the first user terminal 15 compensates the change of the target value. This is done by recalculating at least the E-DPDCH power so that the power reflects both the changed DPCCH power resulting from the changed SIR target value and the improvement due to optimized channel estimation in case of changed SIR real time value.

The power offset configuration provided by the RNC comprises information about the at least one grant threshold for the E-DPDCH absolute grant and reconfiguration information for each threshold on which basis the SIR target value is changed and at least the E-DPDCH power is recalculated. The E-DPDCH power is recalculated by recalculating the power offset on the basis of the reconfiguration information.

The RNC via the power offset configuration informs both the first user terminal 15 and the first radio base station about the grant threshold values for the E-DPDCH absolute grant/s, at which the SIR target and the E-DPDCH should be changed/recalculated. The recalculation is performed by changing the power offset. It will be described later how the SIR target is changed and the power offset is recalculated.

Figure 7:
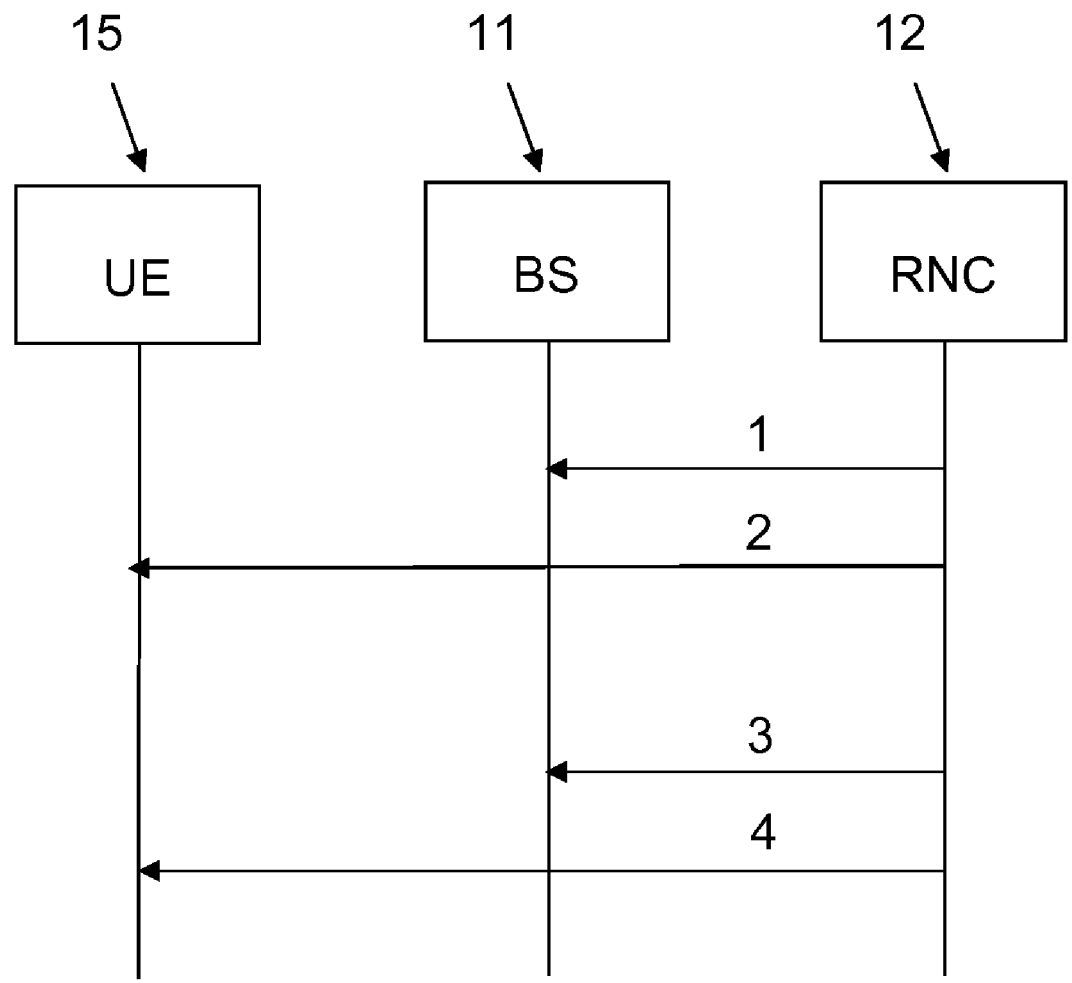
FIG. 7 shows the RNC 12 signalling of the power offset configuration.

FIG. 7 shows the RNC 12 signalling of the power offset configuration to support configuration and reconfiguration of grant threshold in first user terminal 15 and the first base station BS 11. Reference 1 and 2 represents the setup request for the configuration and 3,4 the reconfiguration of the power offset configuration. The setup or reconfiguration may both be used to define the triggering threshold and the changes to apply in SIR target and power offsets, the actual use of the changes to apply to SIR target and power offsets is not triggered by any RNC signal.

The first base station performs at least a first downlink transmission including a first power control command to the first user terminal 15 to control the DPCCH power The DPCCH power is controlled by increasing or decreasing the transmit DPCCH power so that the real time SIR measured is controlled towards the SIR target. The basic control step is +/−1 dB/slot and eventually 2 dB.

The first user terminal 15 and the first base station 11 recalculates a power for at least the High Speed Dedicated Physical Data Channel (HS-DPDCH), the Enhanced Dedicated Physical Data Channel (E-DPDCH) and the Enhanced Dedicated Physical Control Channel (E-DPCCH) on the basis of the power for the DPCCH. The calculation is based on the power offset configuration provided by the RNC (12).

Figure 6:
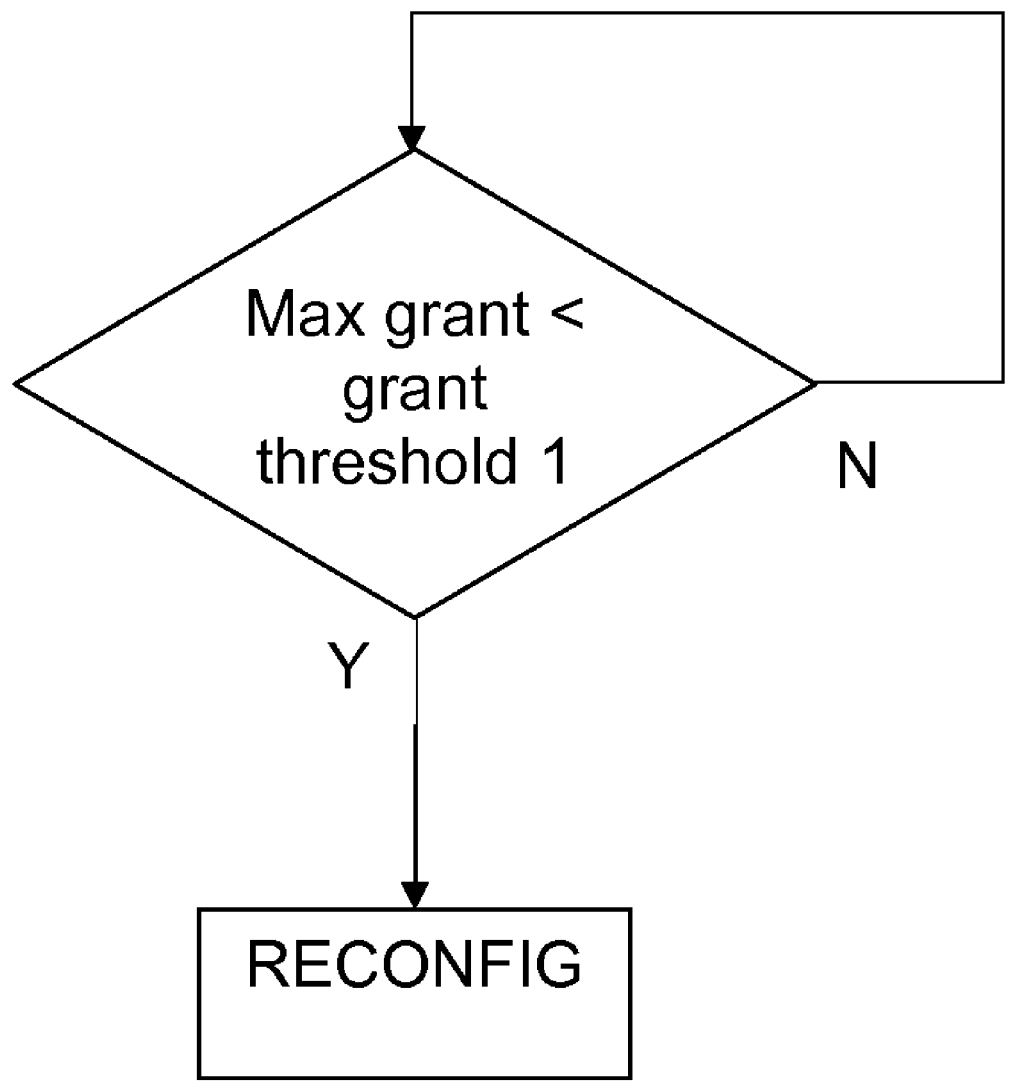
FIG. 6 shows the base station and the UE operation.

The particular control performed when the first base station 11 and the first user terminal 15 detects that the E-DPDCH absolute grant is reduced below or increased above a grant threshold will now be described. This is illustrated in FIG. 6. The basic idea in the present invention are two steps:

1. The SIR target value is changed by the base station 11.

2. To benefit from the optimized channel estimation, the first base station and the first user terminal 15 compensates the change of the target value. This is done by recalculating at least the E-DPDCH power so that the power reflects both the changed DPCCH power and the improvement due to optimized channel estimation.

The change of the SIR real time value and the recalculating of at least the E-DPDCH power are performed when detecting that the E-DPDCH absolute grant is reduced below or increased above the grant threshold. The execution of the power offset recalculation is executed by the first user terminal 15 and the base station 11 on the basis of the power offset configuration.

The performance by the first base station 11 is shown in FIG. 8. "Maximum serving grant" is the maximum E-DPDCH power (headroom) allowed by the base station (which provides the absolute grants). The E-DPDCH absolute grant is provided by the first base station 11 serving the serving cell. The calculation of the E-DPDCH power consequently has to consider the E-DPDCH absolute grant together with calculating based on the power offset configuration. The 3GPP standard 25.321 defines the maximum serving grant.

Grant threshold 1, see FIG. 8, is a certain grant threshold for the E-DPDCH absolute grant. When the first base station 11 detects that at least the E-DPDCH absolute grant is reduced below or increased above the threshold the steps of changing SIR and recalculating at least the E-DPDCH power is performed. The power offset configuration provided by the RNC preferably comprises more than one grant threshold. This means that at certain E-DPDCH absolute grants values these steps are performed. Moreover, it should also be understood by the skilled person that also when maximum serving grant is larger than a grant threshold (for instance grant threshold 1) these steps are performed.

In practise this means that when the absolute grant and consequently the E-DPDCH power increases, the SIR target is increased by the first base station 11 and at least the E-DPDCH real time power is decreased. And when the E-DPDCH is decreased the SIR target is decreased and at least the E-DPDCH real time power is increased.

Reference power offset k, see FIG. 8, is used to calculate the E-DPDCH power for a certain rate. What happens is that when the first user terminal 15 and the first base station 11 detects that the absolute grant for the E-DPDCH is increased above or decreased below a grant threshold, they perform a recalculation of the reference power offset on the basis of the reconfiguration information in the power offset configuration. Correspondingly, a recalculation of the power offset for the physical channel HS-DPCCH and E-DPCCH is performed on the basis of the reconfiguration information in the power offset configuration. Letter "k" only a variable.

The performance by the first user terminal 15 is illustrated in FIG. 9. This means that the first user terminal 15 and the first base station 11 synchronized recalculates the reference power offset, the HS-DPCCH power offset and the E-DPCCH power offset. Both have been informed by the RNC the recalculation policy for the offsets when receiving the power offset configuration. Consequently, they both know the delta power offset that should be used when detecting that the E-DPDCH absolute grant is reduced below or increased above the grant threshold. The delta power offset is configured by the RNC which know how to compensate a changed SIR target. The delta power offset can be either positive (when SIR target is decreased) or negative (when SIR target is increased). They are preferably individual for the respective physical channel and therefore named 1, 2 and 3.

The first base station 11 changes the SIR target value and the base station synchronously with the first user terminal 15 (see FIGS. 8 and 9) compensates the change of the target value if the maximum serving grant is lower than at least one threshold value. This is illustrated in FIG. 6. If maximum serving grant is lower than a grant threshold 1, see box "If maximum serving grant<grant threshold 1", the change of the SIR target value and the reconfiguration is performed, see box RECONFIG, by the first base station 11. This means that the first base station 11 detects that the absolute grant is reduced below the grant threshold a certain value and reduces the signal interference value by configured amount.

As an alternative if the maximum serving grant is higher than the grant threshold 1 a change of the SIR target value and the reconfiguration is performed. This means that the first base station 11 detects that the absolute grant is increased above a certain value and increases the SIR target value by a configured amount. Increasing SIR target and compensating the power offsets for this when the first user terminal will be able to use high power offsets for the E-DPDCH will optimize the usage of the UL interference headroom as well.

The SIR target value is changed by the first base station (11) by adding a delta SIR real time value to the present SIR target value (set by the RNC 12).

This can be expressed as (see FIG. 8):

SIR target=(SIR target as controlled by the RNC)+ (delta SIR 1)

The E-DPDCH power is recalculated by the first base station 11 and the first user terminal 15 by adding a delta power offset value to the present power offset for each reference point.

This can be expressed as (see FIGS. 8 and 9):

Reference power offset $k$=(reference power offset $k$ as controlled by the RNC)+delta power offset 1(for all $k$)

Moreover for HS-DPCCH it can be expressed as (FIGS. 8 and 9):

HS-DPCCH power offset=(hs-dpcch power offset as controlled by the RNC)+delta power offset 2

Finally for E-DPCCH it can be expressed as (FIGS. 8 and 9):

E-DPCCH power offset=($e$-dpcch power offset as controlled by the RNC)+delta power offset 3

As shown the first base station (11) and the first user terminal 15 recalculates the power for at least the High Speed Dedicated Physical Data Channel (HS-DPDCH), the Enhanced Dedicated Physical Data Channel (E-DPDCH) and/or the Enhanced Dedicated Physical Control Channel (E-DPCCH) by adding a delta power offset value to the power offset.

It will be appreciated by the person skilled in the art that various modifications may be made to the above-described embodiments without departing from the scope of the present invention. For instance, the concept is not limited to a single grant threshold. Moreover, the delta power offsets may be the instead of different thresholds. Finally, both a reduction and an increase of the SIR target by a configured amount are possible in order to optimize the usage of the UL interference headroom.

The invention claimed is:

1. A method for power control in an enhanced uplink (UL) telecommunication system comprising at least one first radio network controller (RNC) and at least one first base station enabling wireless communication with at least one first user terminal, the power for an uplink Dedicated Physical Control Channel (DPCCH) in a first enhanced UL transport channel (E-DCH) being controlled by the first base station on the basis of a signal to interference ratio (SIR) target value sent by the first RNC so that the SIR real time value for the UL DPCCH is controlled towards the target value, the first user terminal and the first base station calculating a power for at least an Enhanced Dedicated Physical Data Channel (E-DPDCH) in the first E-DCH, the power being defined as the sum of the DPCCH power and a power offset, the calculation at least being based on a power offset configuration and an absolute grant provided by the first base station, which grant at least set the maximum E-DPDCH power, the first user terminal transmitting the uplink data traffic on the first E-DCH with the controlled DPCCH power and the calculated E-DPDCH power, wherein when the first base station and the first user terminal detects that the E-DPDCH absolute grant is reduced below or increased above a grant threshold the base station changes the SIR target value, the first base station and the first user terminal compensating the change of the target value by recalculating at least the E-DPDCH power so that the power reflects both the changed DPCCH power resulting from the changed SIR target value and the improvement due to optimized channel estimation in case of changed SIR real time value.

2. The method according to claim 1 wherein the power offset configuration provided by the RNC comprises information about at least one grant threshold for the E-DPDCH absolute grant and reconfiguration information for each threshold on which basis the SIR target value is changed and at least the E-DPDCH power is recalculated.

3. The method according to claim 2 wherein the E-DPDCH power is recalculated by recalculating the power offset on the basis of the reconfiguration information.

4. The method according to claim 1 wherein the first base station performs at least a first downlink transmission including a first power control command to the first user terminal to control the DPCCH power.

5. The method according to claim 1 wherein the first user terminal and the first base station further recalculates a power offset for at least the High Speed Dedicated Physical Data Channel (HS-DPDCH), the Enhanced Dedicated Physical Data Channel (E-DPDCH) and the Enhanced Dedicated Physical Control Channel (E-DPCCH) on the basis of the DPCCH power, the calculation being based on the power offset configuration provided by the RNC.

6. The method according to claim 1 wherein the first base station when detecting that the E-DPDCH absolute grant is reduced below a certain value reduces the SIR target value by a configured amount.

7. The method according to claim 1 wherein the first base station when detecting that the E-DPDCH absolute grant is increased above a certain value increases the SIR target value by a configured amount.

8. The method according to claim 6 wherein the SIR target value is changed by the first base station by adding a delta SIR real time value to the present SIR target value.

9. The method according to claim 1 wherein the E-DPDCH power is recalculated by the first base station and the first user terminal by adding a delta power offset value to the power offset for each reference point.

10. The method according to claim 9 wherein the first base station and the first user terminal recalculates the power for at least the High Speed Dedicated Physical Data Channel (HS-DPDCH), the Enhanced Dedicated Physical Data Channel (E-DPDCH) and the Enhanced Dedicated Physical Control Channel (E-DPCCH) by adding a delta power offset value to the power offset.

11. An enhanced uplink (UL) telecommunication system comprising mechanisms arranged for power control, the system comprising at least one first radio network controller (RNC) and at least one first base station enabling wireless communication with at least one first user terminal, the first base station comprising a mechanism arranged for controlling the power for an uplink Dedicated Physical Control Channel (DPCCH) in a first enhanced UL transport channel (E-DCH) on the basis of a signal to interference ratio (SIR) target value sent by the first RNC so that the SIR real time value for the UL DPCCH is controlled towards the target value, a mechanism in the first user terminal and the first base station mechanism are arranged for calculating a power for at least an Enhanced Dedicated Physical Data Channel (E-DPDCH) in the first E-DCH, the power being defined as the sum of the DPCCH power and a power offset, the calculation at least being based on a power offset configuration and an absolute grant provided by the first base station, which grant at least set the maximum E-DPDCH power, the first user terminal mechanism is arranged for transmitting the uplink data traffic on the first E-DCH with the controlled DPCCH power and the calculated E-DPDCH power, wherein the first base station mechanism is arranged for changing the SIR target value when the first base station and the first user terminal detects that the E-DPDCH absolute grant is reduced below or increased above a certain value, the first base station mechanism and the first user terminal mechanism are arranged for compensating the change of the target value by recalculating at least the E-DPDCH power so that the power reflects both the changed DPCCH power resulting from the changed SIR target value and the improvement due to optimized channel estimation in case of changed SIR real time value.

12. The enhanced UL telecommunication system according to claim 11 wherein the first base station mechanism is arranged for performing at least a first downlink transmission including a first power control command to the first user terminal to control the DPCCH power.

13. The enhanced UL telecommunication system according to claim 11 wherein the first user terminal mechanism and the first base station mechanism are arranged for recalculating a power offset for at least the High Speed Dedicated Physical Data Channel (HS-DPDCH), the Enhanced Dedicated Physical Data Channel (E-DPDCH) and the Enhanced Dedicated Physical Control Channel (E-DPCCH) on the basis of the DPCCH power, the calculation being based on the power offset configuration provided by the RNC.

14. The enhanced UL telecommunication system according to claim 11 wherein the first base station mechanism is arranged for reducing the SIR target value by a configured amount when detecting that the E-DPDCH absolute grant is reduced below a certain value.

15. The enhanced UL telecommunication system according to claim 11 wherein the first base station mechanism is arranged for increasing the SIR target value by a configured amount when detecting that the E-DPDCH absolute grant is increased above a certain value.

16. The enhanced UL telecommunication system according to claim 15 wherein the first base station mechanism is arranged for changing the SIR target value by adding a delta SIR real time value to the present SIR target value.

17. The enhanced UL telecommunication system according to claim 13 wherein the first base station mechanism and the first user terminal mechanism are arranged for recalculating the E-DPDCH power by adding a delta power offset to the present offset for each reference point.

18. The enhanced UL telecommunication system according to claim 17 wherein the first base station mechanism and the first user terminal mechanism are arranged for recalculating the power for at least the High Speed Dedicated Physical Data Channel (HS-DPDCH), the Enhanced Dedicated Physical Data Channel (E-DPDCH) and/or the Enhanced Dedicated Physical Control Channel (E-DPCCH) by adding a delta power offset value to the power offset.

19. A base station comprising a mechanism arranged for power control in an enhanced uplink (UL) telecommunication system further comprising at least one first radio network controller (RNC), the at least one first base station enabling wireless communication with at least one first user terminal,
  the first base station mechanism is arranged for controlling the power for an uplink Dedicated Physical Control Channel (DPCCH) in a first enhanced UL transport channel (E-DCH) on the basis of a signal to interference ratio (SIR) target value sent by the first RNC, so that the SIR real time value for the UL DPCCH is controlled towards the target value,
  the first base station mechanism is arranged for calculating a power for at least an Enhanced Dedicated Physical Data Channel (E-DPDCH), the power being defined as the sum of the DPCCH power and a power offset, the calculation at least being based on a power offset configuration and an absolute grant provided by the first base station, which grant at least set the maximum E-DPDCH power,
  wherein
  the first base station mechanism is arranged for changing the SIR target value when the first base station and the first user terminal detects that the E-DPDCH absolute grant is reduced below or increased above a grant threshold,
  the first base station mechanism is arranged for compensating the change of the target value by recalculating at least the E-DPDCH power so that the power reflects both the changed DPCCH power resulting from the changed SIR target value and the improvement due to optimized channel estimation in case of changed SIR real time value.

20. The base station according to claim 19 wherein the first base station mechanism is arranged for performing at least a first downlink transmission including a first power control command to the first user terminal to control the DPCCH power.

21. The base station according to claim 19 wherein the first base station mechanism is arranged for recalculating a power offset for at least the High Speed Dedicated Physical Data Channel (HS-DPDCH),
  the Enhanced Dedicated Physical Data Channel (E-DPDCH) and the Enhanced Dedicated Physical Control Channel (E-DPCCH) on the basis of the DPCCH power, the calculation being based on the power offset configuration provided by the RNC.

22. The base station according to claim 19 wherein the first base station mechanism is arranged for reducing the SIR target value by a configured amount when detecting that the E-DPDCH absolute grant is reduced below a certain value.

23. The base station according to claim 19 wherein the first base station mechanism is arranged for increasing the SIR target value by a configured amount when detecting that the E-DPDCH absolute grant is increased above a certain value.

24. The base station according to claim 22 wherein the first base station mechanism is arranged for changing the SIR target value by adding a delta SIR real time value to the present SIR target value.

25. The base station according to claim 19 wherein the first base station mechanism is arranged for recalculating the E-DPDCH power by adding a delta power offset value to the present offset for each reference point.

26. The enhanced UL telecommunication system according to claim 25 wherein the first base station mechanism is arranged for recalculating the power for at least the High Speed Dedicated Physical Data Channel (HS-DPDCH), the Enhanced Dedicated Physical Data Channel (E-DPDCH) and/or the Enhanced Dedicated Physical Control Channel (E-DPCCH) by adding a delta power offset value to the power offset.

27. A user terminal comprising a mechanism arranged for power control in an enhanced uplink (UL) telecommunication system further comprising at least one first radio network controller (RNC) and at least one first base station enabling wireless communication with at least one first user terminal,
  the first base station controlling the power for an uplink Dedicated Physical Control Channel (DPCCH) in a first enhanced UL transport channel (E-DCH) on the basis of a signal to interference ratio (SIR) target value sent by the first RNC, so that the SIR real time value for the UL DPCCH is controlled towards the target value,
  the first user terminal mechanism is arranged for calculating a power for at least an Enhanced Dedicated Physical Data Channel (E-DPDCH), the power being defined as the sum of the DPCCH power and a power offset, the calculation at least being based on a power offset configuration and an absolute grant provided by the first base station, which grant at least set the maximum E-DPDCH power,
  the first user terminal mechanism is arranged for transmitting the uplink data traffic on the first E-DCH with the controlled DPPCH power and the calculated E-DPDCH power,
  wherein
  the first user terminal mechanism is arranged for changing the SIR target value when the first base station detects that the E-DPDCH absolute grant is reduced below or increased above a grant threshold,
  the first user terminal mechanism is arranged for compensating the change of the target value by recalculating at least the E-DPDCH power so that the power reflects both the changed DPCCH power resulting from the changed SIR target value and the improvement due to optimized channel estimation in case of changed SIR real time value.

28. The user terminal according to claim 27 wherein the user terminal mechanism is arranged for recalculating a power offset for at least the High Speed Dedicated Physical Data Channel (HS-DPDCH), the Enhanced Dedicated Physical Data Channel (E-DPDCH) and the Enhanced Dedicated Physical Control Channel (E-DPCCH) on the basis of the DPCCH power, the calculation being based on the power offset configuration provided by the RNC.

29. The user terminal according to claim 27 wherein the A user terminal mechanism is arranged for recalculating the E-DPDCH power by adding a delta power offset value to the present offset for each reference point.

30. The user terminal according to claim 29 wherein the A user terminal mechanism is arranged for recalculating the power for at least the High Speed Dedicated Physical Data Channel (HS-DPDCH), the Enhanced Dedicated Physical Data Channel (E-DPDCH) and/or the Enhanced Dedicated Physical Control Channel (E-DPCCH) by adding a delta power offset value to the power offset.

* * * * *

UNITED STATES PATENT AND TRADEMARK OFFICE
CERTIFICATE OF CORRECTION

PATENT NO.        : 8,284,728 B2
APPLICATION NO.   : 12/744729
DATED             : October 9, 2012
INVENTOR(S)       : Andersson It is certified that error appears in the above-identified patent and that said Letters Patent is hereby corrected as shown below:

On the Cover Page, item (57), under "ABSTRACT", in Column 2, Lines 1-16,
delete "A method for power control......optimized channel estimation." and
insert -- Disclosed is a method and an enhanced uplink (UL) telecommunication system for power control. The system comprises at least one first radio network controller (RNC) and at least one first base station, which enables wireless communication with at least one first user terminal. The power for an uplink Dedicated Physical Control Channel (DPCCH) in a first enhanced UL transport channel (E-DCH) is controlled. The control is made by the first base station on the basis of a signal to interference ratio (SIR) target value sent by the first RNC. Thereby, the SIR real time value for the UL DPCCH is controlled towards the target value. The first user terminal and the first base station further calculate a power for at least an Enhanced Dedicated Physical Data Channel (E-DPDCH) in the first E-DCH, which power is defined as the sum of the DPCCH power and a power offset. The calculation is at least based on a power offset configuration and an absolute grant provided by the first base station, which grant at least set the maximum E-DPDCH power. The first user terminal further transmits the uplink data traffic on the first E-DCH with the controlled DPCCH power and the calculated E-DPDCH power. When the first base station and the first user terminal detects that the E-DPDCH absolute grant is reduced below or increased above a grant threshold, the base station changes the SIR target value. Further, the first base station and the first user terminal compensates the change of the target value by recalculating at least the E-DPDCH power so that the power reflects both the changed DPCCH power resulting from the changed SIR target value and the improvement due to optimized channel estimation in case of changed SIR real time value. --, therefor.

In Column 2, Line 53, delete "Dedicated" and insert -- Dedicated Physical --, therefor.

In Column 3, Line 1, delete "Absolute" and insert -- Absolute Grant --, therefor.

In Column 3, Line 30, delete "dedicated" and insert -- dedicated physical --, therefor.

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,284,728 B2

In Column 4, Line 1, after "of the", delete "DPCCH," and insert -- DPCCH. --, therefor.

In Column 5, Line 16, delete "improved_channel" and insert -- improved channel --, therefor.

In Column 5, Line 25, delete "the_DPCCH" and insert -- the DPCCH --, therefor.

In Column 8, Line 22, delete "station" and insert -- station. --, therefor.

In Column 8, Line 23, delete "terminal" and insert -- terminal. --, therefor.